United States Patent [19]

Lewis et al.

[11] 4,035,800

[45] July 12, 1977

[54] SHORT-PULSE NON-COHERENT MTI

[75] Inventors: Bernard L. Lewis, Oxon Hill, Md.;
Ben H. Cantrell, Springfield, Va.

[73] Assignee: The United States of America as represented by the Secretary of the Navy, Washington, D.C.

[21] Appl. No.: 725,770

[22] Filed: Sept. 23, 1976

[51] Int. Cl.² .................................. G01S 9/42
[52] U.S. Cl. ........................................ 343/7.7
[58] Field of Search ............................. 343/7.7

[56] References Cited

U.S. PATENT DOCUMENTS

| 3,066,289 | 11/1962 | Elbinger | 343/7.7 |
| 3,134,101 | 5/1964 | Dickey, Jr. | 343/7.7 |
| 3,220,002 | 11/1965 | Shrader | 343/7.7 |
| 3,417,396 | 12/1968 | Stifter et al. | 343/7.7 |
| 3,949,398 | 4/1976 | Donahue | 343/7.7 |

Primary Examiner—Malcolm F. Hubler
Attorney, Agent, or Firm—R. S. Sciascia; Philip Schneider; David G. Rasmussen

[57] ABSTRACT

A non-coherent, non-doppler, MTI radar system has its cancellation notch broadened to include a selected range of target velocities. The apparatus includes a transmitter/receiver for transmitting and receiving short pulses in the nanosecond range. Also included is apparatus for generating multiple MTI responses having cancellation notches at different target velocities and multiplying the responses together to obtain a broadened cancellation notch.

4 Claims, 8 Drawing Figures

SHORT-PULSE NON-COHERENT MTI

BACKGROUND OF THE INVENTION

1. Field of the Invention

The invention relates to a moving-target-indicator (MTI) radar system in which the cancellation notch is broadened to include a selected range of target velocities. More specifically, the invention utilizes a non-coherent, non-doppler, MTI radar system containing apparatus for generating multiple MTI responses having cancellation notches at different target velocities and multiplying the responses together to obtain a broadened cancellation notch.

2. Description of the Prior Art

In an MTI radar system, normally, targets at zero velocity are detected and excluded. It would be desirable to exclude not only those at zero velocity but also those within a range of velocities for example from 0–60 kts (i.e., broaden the cancellation notch). This would allow for elimination of slow-moving targets such as rain squalls etc.

In the prior art, all MTI systems utilized coherent doppler radar for which no satisfactory method has been found for a broadening the cancellation notch. Additionally, non-coherent, non-doppler radar systems could not be used for MTI; hence the problem of broadening the cancellation notch never arose. Non-coherent, non-doppler systems could not be used for MTI because these systems were constrained to use long pulses which prevented MTI operation. The subtraction of the long pulses during MTI operation resulted in a difference that was too insignificant to be detected. Recently, technological advances have made possible transmitters and receivers with short pulses (nsec) having high power.

SUMMARY OF THE INVENTION

The present invention provides a non-coherent, non-doppler, MTI radar system which generates MTI responses having cancellation notches at different target velocities and multiplies them to obtain a broadened cancellation notch. The apparatus includes a conventional transmitter/receiver for transmitting and receiving short pulses. A prf delay receives a first target-return pulse from the transmitter/receiver and delays it by one prf period. A delay bank includes at least two delays with each delay receiving a sample of a second target-return pulse from the transmitter/receiver and delaying each sample of the second target-return pulse by a different amount. A subtracter bank includes subtracters which each receive a different one of the outputs of the delays of the delay bank and each additionally receive the output from the prf delay. The delay bank outputs are subtracted from the prf delay outputs to generate MTI responses having different cancellation notches. The MTI responses are fed to a multiplier which multiplies them to obtain a broadened cancellation notch.

The novel features of the invention are the development of a non-coherent, non-doppler MTI, the use of time delays and a multipler to develop a broadened cancellation notch, and the recognition that the time delays and multiplier will produce a broadened cancellation notch only in a non-coherent, non-doppler, MTI radar system.

BRIEF DESCRIPTION OF THE PERFERRED EMBODIMENT

Figure 1:
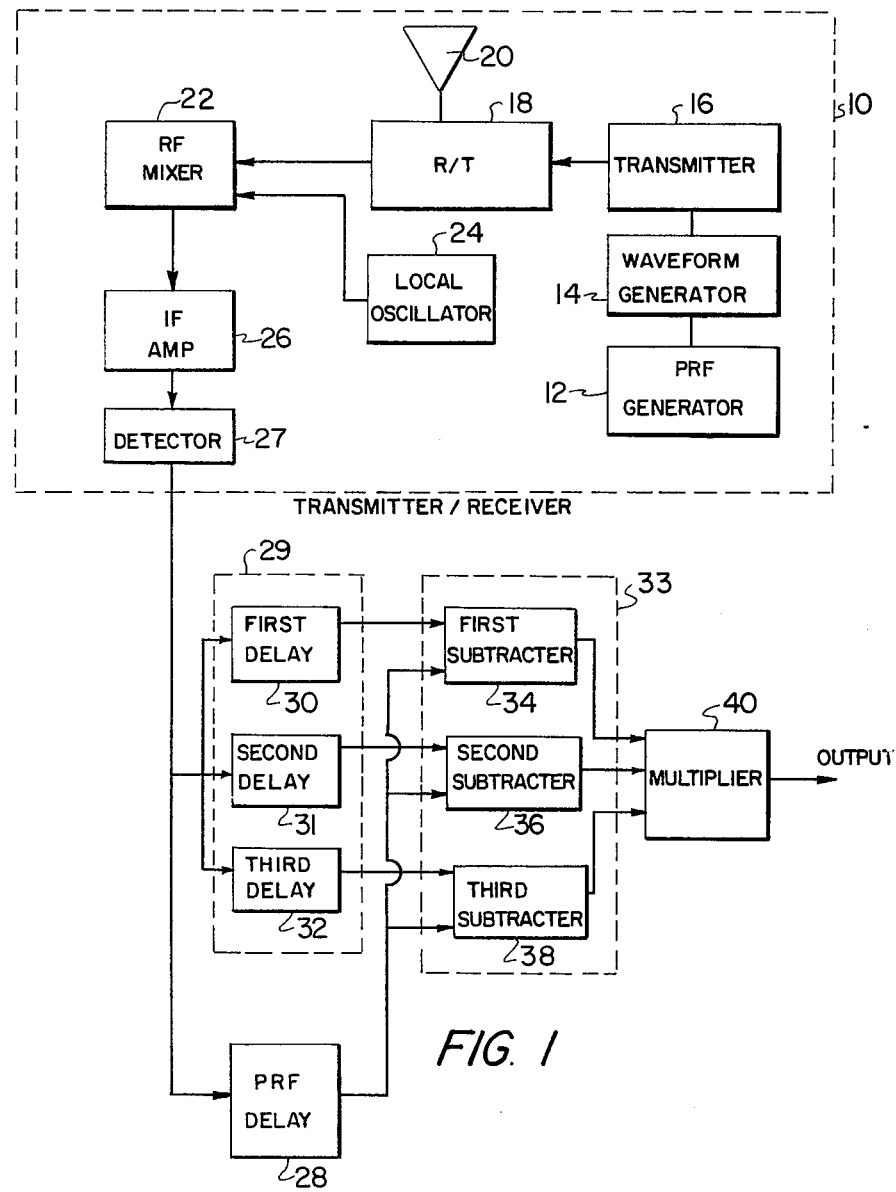
FIG. 1 is a block diagram of a non-coherent, non-doppler, MTI radar system containing apparatus for broadening the cancellation notch.

A non-coherent, non-doppler, MTI radar system containing time delay and multiplier apparatus for broadening the cancellation notch is outlined in FIG. 1. A conventional, pulse-type, non-coherent, non-doppler radar transmitter/receiver unit 10 operates at preferably $x$ band, typically 9300 mhz, a prf of 500 pulses per second, and a pulse width of 10 nsec. Transmitter/receiver 10 is of a class using pulse compression to obtain very short high-power pulse at $x$ band.

Transmitter/receiver 10 includes a prf generator 12, waveform generator 14, transmitter 16, R/T unit 18, antenna 20, RF mixer 22, local oscillator 24, IF amplifier 26, and detector 27. The output of detector 27 is connected to a prf delay 28 which will delay the target-return pulses by one prf period. The output of detector 27 is also provided to a delay bank 29, consisting of first, second and third delays, 30, 31 and 32, respectively. More delays could be used in the bank although only three are shown. The lengths of these time delays are explained as follows. The target-return pulse entering these time delays is to be used in MTI operations. The effect of delaying samples of the incoming target-return pulse by varying amounts (small fractions of the pulse length) will be to generate artificial velocities at which the target velocity will appear to be zero during MTI operation. These artificial velocities will be the cancellation notches. First delay circuit 30 will delay a sample of the incoming target-return signal by a period of time necessary to establish a cancellation notch which will be the lower-limit velocity for the desired broad cancellation notch. Normally, the lower-limit velocity is desired to be zero but the delay may be increased if the desired lower-limit velocity is increased. Second delay 31 will delay a sample of the incoming target-return signal by a slightly greater duration necessary to establish a cancellation notch at an intermediate velocity of, for example, 30 kts. The third delay 32 will delay a sample of the incoming signal by a greater duration to establish the upper-limit cancellation notch at a velocity of, for example, 60 kts.

The outputs from first, second, and third delays 30, 31, and 32 are fed, respectively, to subtracter bank 33 and, specifically, to first, second, and third subtracter 34, 36, 38, respectively. Subtracters 34, 36, 38 also receive inputs from the prf delay 28. Subtraction of the outputs of first, second, and third delays 30, 31, 32 from the output of prf delays 28 takes place in the subtracters. Each subtraction is a separate MTI operation. The outputs of the subtracters are fed to multiplier 40 where multiplication of the output takes place. The output of the multiplier is a broadened cancellation notch which will cancel target-returns from 0–60 kts.

Figure 2:
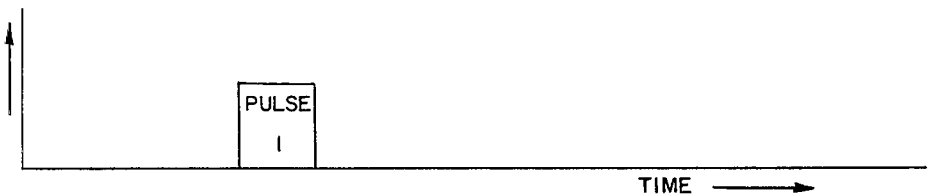
FIG. 2 is a graph of the first pulse of a pair of pulses used for MTI operations.

FIG. 2 shows a first target-return pulse received by transmitter/receiver 10, which has been delayed on prf period by prf delay 28 shown in FIG. 1. This pulse will be one of the pair of pulses in each of subtracters 34, 36, 38 of FIG. 1 that will be used for MTI operation.

Figure 3:
FIG. 3 is a graph of the second pulse of a pair of pulses used for MTI operations.

FIG. 3 shows a second target-return pulse received by transmitter/receiver 10 in succession after the first target-return pulse of FIG. 2. The second target-return pulse is applied to first, second, and third delays 30, 31, 32 of FIG. 1 and will be the second of a pair of pulses used in subtracters 34, 36, 38 for MTI operation.

Figure 4:
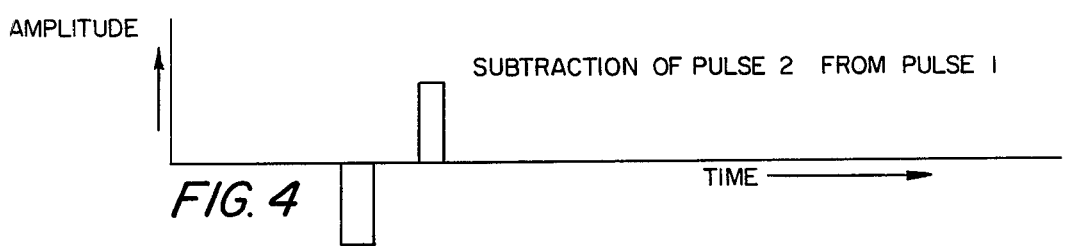
FIG. 4 is a graph of the resultant waveform of the MTI operation performed by subtraction of the second pulse in FIG. 3 from the first pulse of FIG. 2.

FIG. 4 shows the resultant waveform of the MTI operation performed in any of subtracters 34, 36, 38 in which the second target-return pulse of FIG. 3 is subtracted from the first target-return pulse of FIG. 2. Since the first target-return pulse of FIG. 2 is delayed by one prf period it will be approximately coincident in time with the received second target-return pulse of FIG. 3. Any difference in time between the pulses, as determined by the subtraction, will indicate that the target is moving. The resultant waveform has both a negative and a positive portion, both of which will provide a moving-target indication. For purposes of illustration, only the positive portion of the pulse will be considered.

Figure 5:
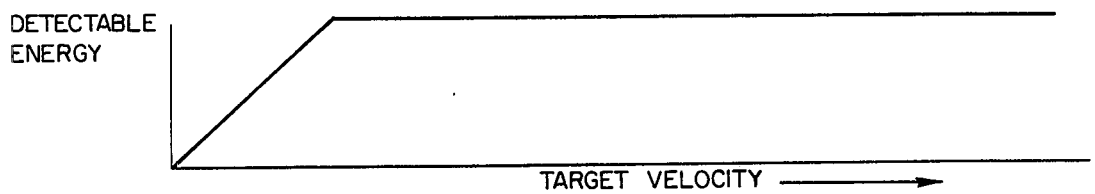
FIG. 5 is a graph of the target velocity plotted as a function of the amplitude of the positive portion of the waveform of FIG. 4 with a cancellation notch shown at zero velocity.

FIG. 5 shows the target velocity plotted against the detectable energy of the waveform of FIG. 4 for the MTI operation occurring in subtracter 34 with no delay introduced by first delay 30. At zero velocity there is no detectable energy. This means that, if a target had zero velocity, the two pulses of FIGS. 2 and 3 would subtract completely leaving no detectable energy in the waveform of FIG. 4. The target would be in the cancellation notch. If the target velocity increased, as shown on the graph of FIG. 5, there would be incomplete subtraction of the two pulses of FIGS. 2 and 3 and a moving target would be indicated. The curve levels out horizontally at the maximum detectable energy which indicates where the two pulses of FIGS. 2 and 3 are separated completely so that they do not subtract. Any point along the sloping or horizontal portion of the curve will indicate that a target is moving.

Figure 6:
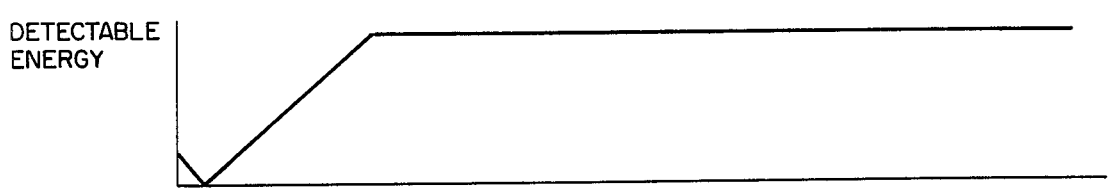
FIG. 6 is a graph of the curve shown in FIG. 5 with the cancellation notch shifted away from zero velocity to an intermediate velocity.

FIG. 6 shows that same curve as FIG. 5 except the cancellation notches has been shifted to an intermediate velocity of 30 kts. This shift is accomplished by delaying the second target-return pulse shown in FIG. 3, with second delay 31 shown in FIG. 1.

Figure 7:
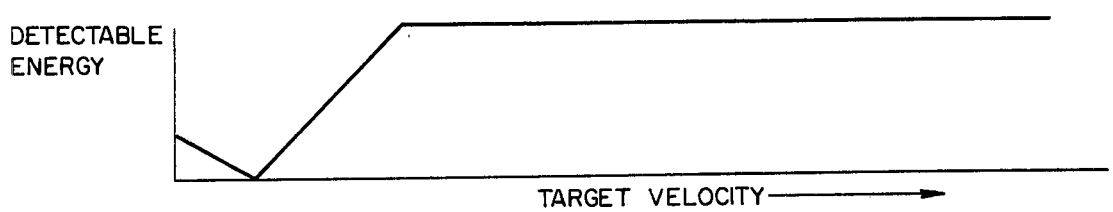
FIG. 7 is a graph of the curve shown in FIG. 5 with the cancellation notch shifted to an upper limit target velocity for the broadened cancellation notch.

FIG. 7 shows the same curve as FIG. 5 except the cancellation notches has been shifted to a target velocity of 60 kts. This is accomplished by delaying the second target-return pulse by the third delay 32 shown in FIG. 1.

Figure 8:
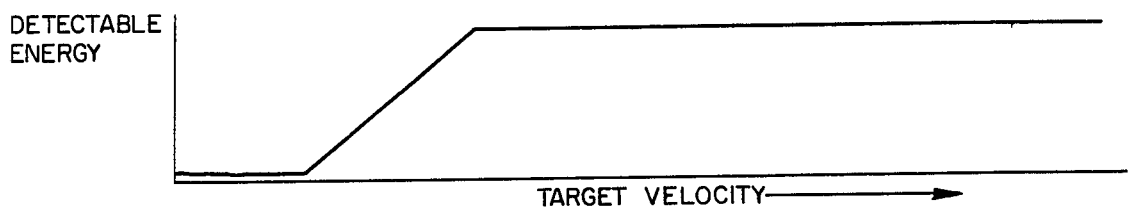
FIG. 8 is a graph of the response resulting from the multiplication of the responses of FIGS. 5, 6, and 7.

FIG. 8 shows the response resulting from multiplying the responses shown in FIGS. 5, 6, 7 together. The cancellation notches has been expanded to extend from a lower-limit target velocity of zero to an upper-limit target velocity of 60 kts (or any desired range of velocities).

In operation, a series of short pulses of 10 nanosecond width are transmitted at a prf of 500 pulses per second from transmitter/receiver 10. Target-return pulses are received and non-coherently detected in transmitter/receiver 10. In non-coherent detection, the local oscillator frequency is not reference to or derived from the transmitter frequency. The invention involves two-pulses MTI, therefore, it is only necessary to describe MTI operation with respect to one pair of successively received target-return pulses.

The first received target-return pulse of the pair is sent from detector 27 to prf delay 28 where it is delayed by one prf. The delayed pulse is shown in FIG. 2. The second target-return pulse is shown in FIG. 3 and is fed to first, second and third delays 30, 31, 32. Since the first target-return pulse has been delayed by one prf period, it is nearly coincident in time with the second target-return pulse as it is about to enter first, second, and third delays 30, 31, 32. The only time difference between the first and second target-return pulses at this point will be that due to movement of the target.

The first target-return pulse, after being delayed by prf delay 28, will be fed to first subtracter 34 which also receives the second target-return pulse at about the same time. MTI operation takes place with the second target-return pulse being subtracted from the first target-return pulse and a waveform, such as that shown in FIG. 4, resulting. Depending on the target velocity, the detectable energy from the MTI operation will be shown by the curve of FIG. 5 which has a cancellation notch at 0 velocity.

Likewise, MTI operation occurs in second subtracter 36 which receives the first and second target-return pulses from prf delay 28 and second delay 31, respectively. The detectable energy from the subtraction will be shown on the curve of FIG. 6 which has a cancellation notch of 30 kts.

Similarly, MTI operation occurs in third subtracter 38 using third delay 32 and the detectable energy from its subtraction is shown on the curve of FIG. 7 which hasa cancellation notch at 60 kts.

The three different MTI operations generate cancellation notches across a range of 0–60 kts. If the target velocity is in this range, it will be at or near the cancellation notch for one of the MTI operations and its detectable energy will be zero or very low. When the outputs of the subtracters are multiplied in multiplier 40, a zero or low output will cause the product of the multiplication to go to zero. In other words, if a target velocity falls anywhere in the broadened cancellation notch the multiplication product will go to zero. This will be an indicator that the target is slow-moving and may be excluded. Likewise, if the product has a high amplitude this indicates a target of interest which is not within the broadened cancellation notch.

The output of the above-described MTI system may be used as the video input to a PPI (plan position indicator) scope. This scope displays returns from moving targets as bright dots at their respective azimuth angle and range. Echoes from non-moving targets are cancelled by the MTI and are not displayed on the PPI. The PPI in effect will intergrate moving target-returns so that they will become detectable above the thermal noise and clutter threshold.

Obviously many modifications and variations of the present invention are possible in light of the above teachings. It is therefore to be understood that within the scope of the appended claims the invention may be practiced otherwise than as specifically described.

What is claimed and desired to be secured by letters patent of the United States is:

1. In a non-coherent, non-doppler, MTI system including a transmitter/receiver for transmitting and receiving short pulses, means providing a broadened cancellation notch comprising:

prf delay means, receiving the output of said transmitter/receiver, for delaying a first target-return pulse received from said transmitter/receiver by one prf period;

delay bank means, including at least two delay circuits with each said delay circuit receiving a sample of a second target-return pulse from said transmitter/receiver for delaying each sample of said second target-return pulse by a different amount;

subtracter bank means, including at least two subtracters, each receiving a different one of the outputs of said delay circuits of said delay bank and each additionally receiving the output of said prf delay means, for separately subtracting the outputs of said delay circuits from the output of said delay means; and multiplier means for receiving the outputs of said subtracters and for multiplying them together to obtain said broadened cancellation notch.

2. The apparatus of claim 1, in which one of said time-delay circuits of said delay bank provides a zero time delay, thereby placing the lower limit of said broadened cancellation notch at zero target velocity.

3. The apparatus of claim 1, which all of the time delay circuits of said delay bank have a time delay greater than zero, thereby placing the lower limit of said broadened cancellation notch at a target velocity greater than zero.

4. A method for achieving a broadened cancellation notch in a non-coherent, non-doppler, MTI system utilizing short pulses, comprising the steps of:

delaying a sample of a first target-return pulse by one prf period;

delaying a sample of a second target-return pulse by at least two different time delays defining a desired range of target velocities to be cancelled;

separately subtracting each said time-delayed second target-return pulse from said delayed first target-return pulse to obtain MTI responses; and multiplying said MTI responses to obtain a broadened cancellation notch.

* * * * *